UNITED STATES PATENT OFFICE.

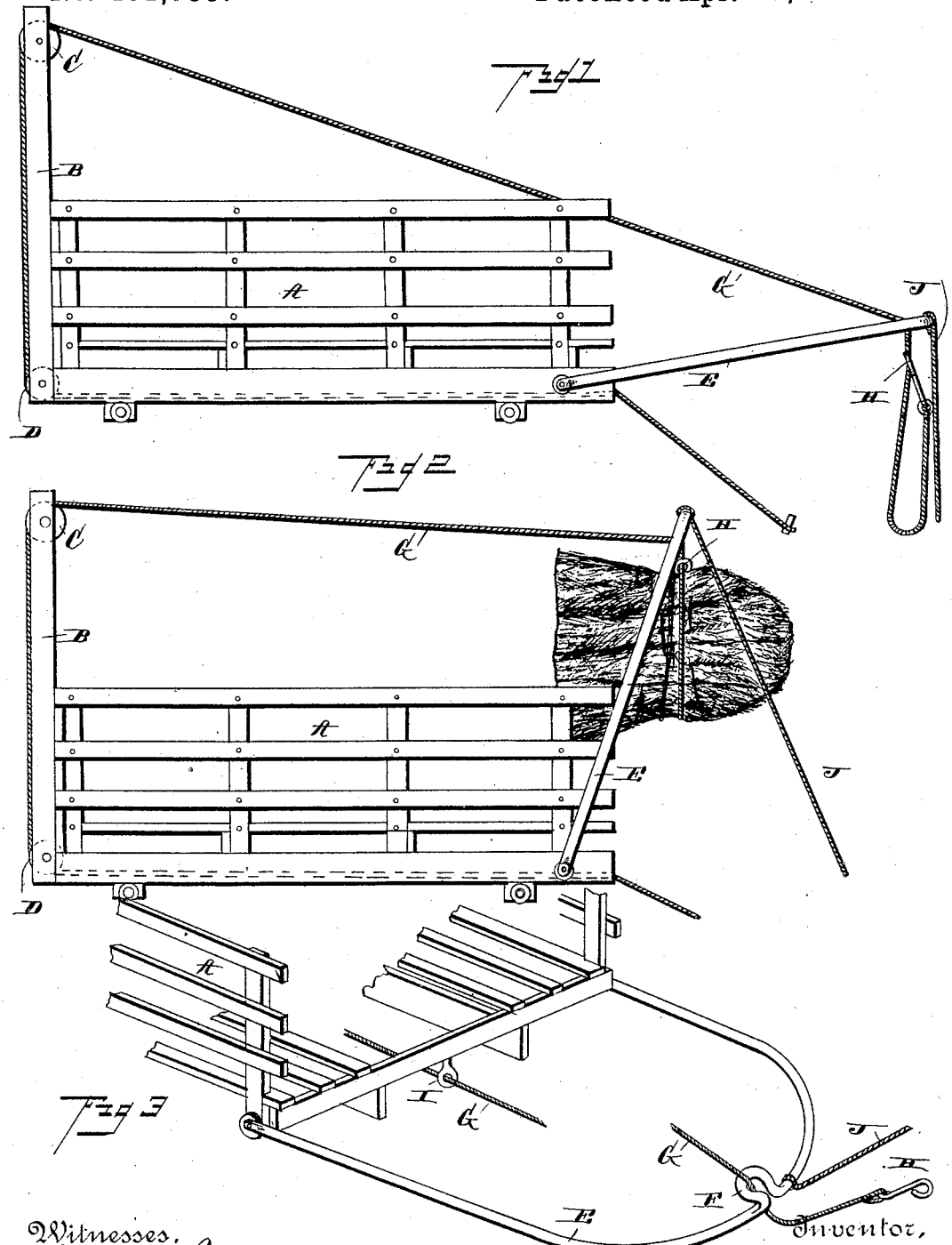

GEORGE CARR, OF CHARLES CITY, IOWA.

HAY AND GRAIN RACK.

SPECIFICATION forming part of Letters Patent No. 401,733, dated April 23, 1889.

Application filed January 26, 1889. Serial No. 297,639. (No model.)

*To all whom it may concern:*

Be it known that I, GEORGE CARR, a citizen of the United States, residing at Charles City, in the county of Floyd and State of Iowa, have invented a new and useful Improvement in Hay and Grain Racks, of which the following is a specification.

My invention relates to improvements in hay and grain racks, and has for its object the provision of means whereby the bundle can be lifted over onto the rack without any exertion on the part of the operator.

The invention consists in certain novel features, hereinafter described and claimed.

In the accompanying drawings, Figure 1 is a side elevation of a rack provided with my improvements. Fig. 2 is a similar view showing a shock of grain raised over the rack. Fig. 3 is a detail perspective view of the rear end of the rack.

Referring to the drawings by letter, A designates a rack of the usual or any preferred construction, supported upon a wagon running-gear in the ordinary manner. At the front end of the rack and at the center of the same I erect the standard B, having a pulley or roller, C, journaled in its upper end, and a similar pulley or roller, D, journaled in its lower end. At the rear end of the rack I provide the lifting arm or bail E, the ends of which are pivoted to the opposite sides of the rack at the rear end of the same, as shown. The bail is provided at its center with an eye or loop, F, through which the operating-rope G passes. This operating-rope is provided at its rear end with the hook H, and from the said hook it passes through the eye F, thence forward and over the pulley C at the upper end of the standard B, thence downward and under the pulley D at the lower end of said standard, and thence rearwardly beneath the rack and through a guide, I, at the rear end of the same, as shown.

J designates a small rope which is secured to the bail, and is intended to be used to draw the bail downward and rearward after it has been operated to lift the shock onto the rack.

From the foregoing description, taken in connection with the accompanying drawings, it is thought that the operation of my device will be readily understood. The rack is drawn to a position near the shock of grain, and the bail then drawn downward, as shown in Fig. 1. The rope G is then passed around the shock of grain and made fast to itself by the hook H, and the free end of the rope G is fastened to a stake in the ground, as shown in said figure. The rack is then drawn toward the next shock. As the rack moves over the ground, the rope G will be tightened, and its rear end being secured to the stake or anchor, as shown and described, the movement of the rack will cause the said rope to move over the pulleys C D, so that a tension will be exerted through the rope on the lifting-bail, and the bail thereby raised, as shown in Fig. 2 and as will be readily understood. The shock of grain will thus be lifted over onto the rack without any exertion on the part of the attendant, and the loading of the rack will be rapidly and effectually accomplished. When the shock has been lifted over onto the rack, the free end of the rope G is released from the anchor or stake and the hook disengaged from the shock, so that the rack can be then drawn to a position adjacent to the next shock without any trouble, when the above-described operation will be repeated.

The simplicity of my device is apparent from the drawings, and its advantages are thought to be obvious. It is more especially adapted for use when gathering up the scattered shocks of grain or bundles of hay from the field and carrying them to the barn or store-house.

When the device is used in handling hay, the hook H may be removed and a hay-fork substituted without involving a departure from the invention.

Having thus described my invention, what I claim, and desire to secure by Letters Patent, is—

1. The combination, with the rack, of the lifting-bail pivoted to the rear end of the same, and the operating-rope passing forward over the rack and across the front end of the same and then rearwardly beneath the rack, whereby, as the rack is drawn forward, the bail will be raised, as set forth.

2. The combination, with the rack, of the standard erected at the front end of the same, the pulleys C D, journaled in the upper and lower ends of the standard, the lifting-bail pivoted to the rear ends of the rack, and the rope passing from the said bail over the pulley C and under the pulley D and thence rearward beneath the rack, as set forth.

3. The combination, with the rack, of the standard erected at the front end of the same, the rollers C D, journaled in the upper and lower ends of the said standard, the bail pivoted to the rear end of the rack and having an eye at its center, the rope passing through said eye over the pulley C and under the pulley D and thence rearward beneath the rack, the hook secured to the end of said rope, and the rope J, secured to the bail, as specified.

In testimony that I claim the foregoing as my own I have hereto affixed my signature in presence of two witnesses.

GEORGE CARR.

Witnesses:
J. S. ROOT,
F. A. HAND.